Patented Sept. 5, 1922.

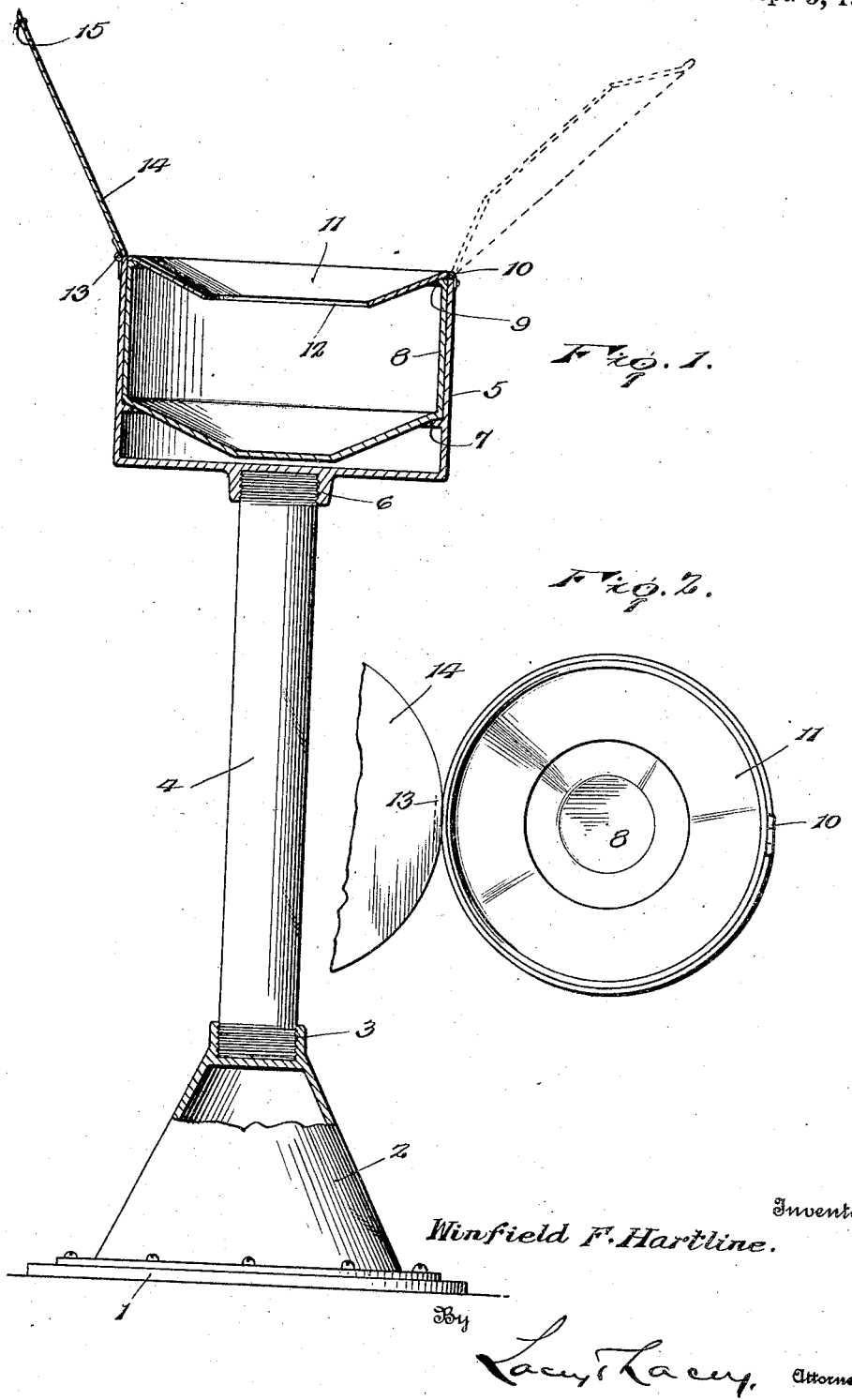

1,427,809

UNITED STATES PATENT OFFICE.

WINFIELD F. HARTLINE, OF CANTON, OHIO.

CUSPIDOR.

Application filed August 31, 1921. Serial No. 497,130.

*To all whom it may concern:*

Be it known that I, WINFIELD F. HARTLINE, a citizen of the United States, residing at Canton, in the county of Stark and State of Ohio, have invented certain new and useful Improvements in Cuspidors, of which the following is a specification.

My invention relates to cuspidors and has for its object the provision of means whereby a cuspidor may be readily handled and moved from place to place as may be desired and which will be sightly at all times and sanitary in its use. A further object of the invention is to provide a portable support for a cuspidor pan from which the pan may be easily removed when cleaning thereof is necessary, and also to provide means whereby soiling of objects near the cuspidor will be avoided and the cuspidor may be hidden from view when not in use. Other objects of the invention will appear incidentally in the course of the following description.

The invention is illustrated in the accompanying drawings, in which—

Figure 1 is a view, partly in side elevation and partly in vertical section, of a cuspidor embodying my invention;

Fig. 2 is a plan view.

In carrying out my invention, I employ a base plate 1 which may be of any desired or preferred material and form. Upon the base plate 1, I secure a foot piece 2 which may conveniently be a metal casting of conical form having an internally threaded socket 3 at its apex. In the said socket 3, I secure the lower end of a stem 4, the foot piece 2 and the stem 4 constituting a pedestal which may be of any desired height and may be ornamented in any preferred manner and which will support the cuspidor at a convenient height to permit its use adjacent a bed or in any other place where a moderate elevation of the cuspidor is desirable. Upon the upper end of the stem 4, I secure a bowl or container 5 which is shown as provided on its under side with an internally threaded boss or socket 6 whereby the bowl may be readily fitted upon the upper end of the stem. Within the bowl is an annular ledge or supporting shoulder 7 upon which the cuspidor pan 8 may rest and the bowl and the pan may be given any desired configuration, the drawing showing a circular bowl and pan. The pan may be of sheet metal or of any other material and it should be of such dimensions that its side wall will rest snugly against the inner face of the side wall of the bowl, this arrangement permitting the use of a pan made of paper or other inexpensive material so that a used pan may be removed and destroyed as occasion may demand. To facilitate the removal of the pan when necessary, any convenient projection may be provided at the upper edge thereof and in the drawings I have shown a slight bead or flange 9 which may be readily engaged by the fingers or by any withdrawing tool. To the upper edge of the bowl, I secure by a hinge, indicated at 10, a guard 11 which is preferably in the form of an annulus converging downwardly from its outer edge to its inner edge and presenting an opening 12 through which the saliva or other matter flows into the pan. At the opposite side of the bowl, I secure to the upper edge thereof, by a hinge 13, a cover 14 which is imperforate and which, when closed, will extend over the guard and hide the same from sight. The cover may be provided at its free edge with any convenient form of handle, as indicated at 15.

Normally the guard 11 and the cover 14 will both be in closed position. When use of the pan is desired, the cover 15 may be swung upwardly to the position shown in Fig. 1 and the cuspidor then used in the usual manner. When removal of the pan becomes necessary, the cover is raised, as shown in the drawings, and the guard 11 is also swung over to the dotted line position shown in Fig. 1, whereupon the pan may be easily lifted from the bowl and a new pan substituted therefor or the used pan returned after being cleaned. The use of the guard will prevent the spattering of saliva or other matter over the bowl or objects near which the cuspidor may be placed and will also prevent the deposited matter scattering upon the inner walls of the pan around the upper edge of the same so as to render the removal of the pan distasteful. When the cover is closed the cuspidor will be hidden from view, and the pedestal and bowl may be ornamented so as to constitute an attractive article of furniture. Moreover, the cover and the guard will serve to prevent the escape of disease-spreading germs and will also avoid the escape of obnoxious odors. The device is very simple in its construction and may be produced at a very low cost. It will, of course, be understood that the stem may be integral with the foot piece and the base or otherwise connected thereto but the threaded connection illustrated facilitates packing for storage and transportation and also permits some vertical adjustment of the stem.

Having thus described the invention, what is claimed as new is:

A cuspidor comprising a pedestal, a bowl carried by the upper end of the pedestal and having a circumferential bead on its inner wall above its bottom, a guard hinged to the upper edge of the bowl and adapted to extend across the bowl, said guard consisting of a dished annulus, a cover hinged to the upper edge of the bowl at a point diametrically opposite the guard, the cover being adapted to overlie the guard, and a pan fitting closely within the bowl and having a tapered bottom resting on the circumferential bead in the bowl, the pan being provided at its top with an internal flange and the guard overlying the pan with its inner circular edge below the top of the pan.

In testimony whereof I affix my signature.

WINFIELD F. HARTLINE.